United States Patent
Lee

(10) Patent No.: US 9,346,517 B2
(45) Date of Patent: May 24, 2016

(54) AUTOMATIC AND MANUAL ELECTRICAL GEAR SHIFTING APPARATUS AND METHOD FOR ELECTRIC VEHICLES

(71) Applicant: NATIONAL CHENG KUNG UNIVERSITY, Tainan (TW)

(72) Inventor: Sen-Yung Lee, Tainan (TW)

(73) Assignee: National Cheng Kung University, Tainan (TW)

( * ) Notice: Subject to any disclaimer, the term of this patent is extended or adjusted under 35 U.S.C. 154(b) by 152 days.

(21) Appl. No.: 14/058,387

(22) Filed: Oct. 21, 2013

(65) Prior Publication Data

US 2015/0032340 A1   Jan. 29, 2015

(30) Foreign Application Priority Data

Jul. 24, 2013  (TW) .............................. 102126391 A

(51) Int. Cl.
| | |
|---|---|
| *B60W 10/08* | (2006.01) |
| *B60W 30/19* | (2012.01) |
| *B62M 25/08* | (2006.01) |
| *F16H 61/02* | (2006.01) |
| *F16H 59/04* | (2006.01) |
| *B62M 25/00* | (2006.01) |

(52) U.S. Cl.
CPC ............. *B62M 25/08* (2013.01); *F16H 59/044* (2013.01); *F16H 61/0204* (2013.01); *B62M 2025/003* (2013.01)

(58) Field of Classification Search
CPC .............................. B60W 10/08; B60W 30/19
See application file for complete search history.

(56) References Cited

U.S. PATENT DOCUMENTS

| | | | | |
|---|---|---|---|---|
| 7,290,779 | B2 * | 11/2007 | Takamoto | B62K 23/04 280/260 |
| 7,373,232 | B2 * | 5/2008 | Guderzo | B62M 9/122 474/116 |
| 9,008,931 | B2 * | 4/2015 | Cheng | B62M 25/08 474/69 |
| 2011/0168469 | A1 * | 7/2011 | Hansson | 180/65.275 |
| 2012/0130609 | A1 * | 5/2012 | Jess et al. | 701/54 |
| 2012/0253606 | A1 * | 10/2012 | Takamoto | B62J 15/00 701/48 |
| 2013/0345019 | A1 * | 12/2013 | Kaltenbach et al. | 477/5 |

\* cited by examiner

*Primary Examiner* — Tisha Lewis
(74) *Attorney, Agent, or Firm* — Rosenberg, Klein & Lee

(57) ABSTRACT

The automatic and manual electrical gear shifting apparatus includes a manual electrical gear shifting unit, for detecting a driving status and transmitting a sensing signal; a control unit, coupled to the sensing unit and the manual electrical gear shifting unit, and also coupled to a driving shift device and a mid-power motor, and a shift correction unit being coupled between the driving shift device and the control unit. The control unit resets the driving shift device to a start shift when the electric vehicle stops and if the transmission of an electric vehicle is an internal transmission. If the transmission of the electric vehicle is an external transmission and the shift of the driving shift device is set to a high gear, the control unit automatically increases the electrically assisted power of the electric vehicle.

15 Claims, 10 Drawing Sheets

AUTOMATIC AND MANUAL ELECTRICAL GEAR SHIFTING APPARATUS AND METHOD FOR ELECTRIC VEHICLES

FIELD OF THE INVENTION

The present invention relates to an automatic and manual electrical gear shifting apparatus for electric vehicles and a method thereof, in particular to the apparatus and method capable of linking to a forward transmission, a reverse transmission, an external transmission or an internal transmission of a two-wheel electric vehicle to control the shift of gears of the two-wheel electric vehicle shift automatically or manually, so that users can change gears anytime according to their preference or requirement, and the invention can achieve the effects of convenient operation and high applicability.

BACKGROUND OF THE INVENTION

In recent years, the promotion of environmental protection and energy saving and carbon reduction become increasingly more important, and substitute energy becomes one of the major research subject of green energy technology, wherein transportation means using petroleum as power are necessary for the present transportation, but the air pollution caused by the petroleum fuel is a major problems that different countries strive to improve, and thus riding bicycle becomes a rising trend. To enhance the mobility, convenience and practicality of the bicycle, electric bikes and electric vehicles are introduced, and it is major objectives for related manufacturers to improve the performance of the electric bikes and electric vehicles to achieve the objectives of saving energy, reducing carbon, and preventing air pollution.

However, the conventional electric bike, electrically assisted power bike or electric motorcycle generally does not come with an automatic gear shifting design. Particularly, the electric gear shifting device with a combination of automatic and manual operations has a gear shifting status only operated manually by operating a push button, a gear shift rotating handle, or a gear shift dial, and transmitted through a circuit, and electric power is supplied to pull the shift cable to perform a manual gear shift of the transmission, or a sensor is provided for detecting a traveling status such as the slope of the terrain or the traveling speed of an electric bike or an electrically assisted power bike, so as to change the speed of the electric motor. Therefore, the conventional electric bike, electrically assisted power bike or electric motorcycle cannot be switched according to the user's preference or requirement and does not have any electric gear shift mechanism. As a result, the speed change of the electric motor does not match with the gear shift of the transmission, and the speed change or gear shift cannot be accomplished smoothly, and users have to purchase an electric bike or an electrically assisted power bike with different shifting or speed changing modes, and thus incurring lots of cost and causing tremendous inconvenience on carrying and operation.

Another prior art provides a "Bicycle shift control apparatus that cancels a tentative shift" as disclosed in U.S. Pat. No. 7,290,779, and the apparatus is installed to a general bicycle, and its structure is shown in FIG. 1, and the apparatus comprises: a power generation hub 10, installed at a front wheel of the bicycle, for sending the traveling speed of the bicycle; a motion position sensor 20, installed at a reverse transmission of the bicycle, for detecting the position of the transmission; a control unit 30, coupled to the power generation hub 10 and the motion position sensor 20, and sequentially and electrically coupled to a motor driving device 40 and a motor transmission device 50, wherein the motor transmission device 50 is mechanically coupled to the reverse transmission, and the control unit 30 of the bicycle has a manual shift mode and an automatic shift mode; an input unit 60, coupled to the control unit 30; and a mode switching device 70, coupled to the control unit 30, such that the control unit 30 can be switched to either a manual shift mode or an automatic shift mode. After the mode switching device 70 switches to the automatic mode, and the power generation hub 10 detects the speed of the bicycle, the control unit 30 controls the motor driving device 40 and the motor transmission device 50 for changing the speed of the forward and reverse transmissions. When the control unit 30 is switched to the manual mode, the user can operate and control the input unit 60, and the control unit 30 controls the motor driving device 40 and the motor transmission device 50 to change the speed of the forward and reverse transmissions.

U.S. Pat. No. 7,290,779 can be applied to the forward and reverse transmissions of a general bicycle only, but cannot be applied to a two-wheel electric vehicle and its internal transmission, and thus the scope of applicability is limited. As to the manual shifting, many users still prefer using a shifting rotary handle or a shifting dial to change the speed of the bicycle, and thus the press-button of the mode input unit 60 cannot be operated easily. In addition, if a vehicle is traveling, and the control unit 30 is damaged, then the gear of the bicycle cannot be shifted regardless of the automatic shift or manual shift. As a result, the speed of the bicycle may be lost, and the user's safety is jeopardized.

In view of the aforementioned drawbacks of the prior art, the inventor of the present invention based on years of experience in the related industry to conduct extensive researches and experiments, and finally developed an automatic and manual electrical gear shifting apparatus and method for electric vehicles in accordance with the present invention to overcome the drawbacks of the prior art.

SUMMARY OF THE INVENTION

Therefore, it is a primary objective of the present invention to overcome the aforementioned problems of the conventional electric bike or electrically assisted power bike that allows users to select either the manual gear shift or the electric gear shift only, but does not allow the users to switch on their own anytime according to the users' preference or requirement, and requires the users to purchase an electric bike or an electrically assisted power bike with different gear shifting modes and thus causing tremendous inconvenience on carrying and operation, and the speed changing device with a manual electric gear shifting cannot be applied to a two-wheel electric vehicle and its internal transmission, and thus causing an inconvenient operation and a speed loss and jeopardizing the safety of the users.

To achieve the aforementioned objective, the present invention provides an automatic and manual electrical gear shifting apparatus and method for electric vehicles, comprising: a manual electrical gear shifting unit, operated manually, for transmitting a gear shift command; a sensing unit, for detecting a driving status, and transmitting a sensing signal; and a control unit, coupled to the sensing unit and the manual electrical gear shifting unit, and further coupled to a driving shift device and a mid-power motor, and a shift correction unit being coupled between the driving shift device and the control unit, and the control unit being provided for analyzing and computing the shift command and the sensing signal to generate an electrical shift signal and a total shift value, and the control unit further including a control function for improving the riding comfort of a rider at a start; such that the driving shift device can receive the electrical shift signal to perform a gear shift, and the mid-power motor can perform a torque gear shift by the control unit, and the shift correction unit has a setting and notices the control unit to correct the total shift value when the driving shift device changes the shift to the setting.

According to the aforementioned automatic and manual electrical gear shifting apparatus and method for electric vehicles, the apparatus further comprises a first switch unit installed between the sensing unit and the control unit, and a second switch unit installed between the manual electrical gear shifting unit and the control unit, and the first switch unit is controlled to selectively stop the control unit from receiving the sensing signal, and the second switch unit is controlled to selectively stop the control unit from receiving the gear shift command.

According to the aforementioned automatic and manual electrical gear shifting apparatus and method for electric vehicles, the driving shift device is coupled to a transmission, and when the sensing unit senses the driving status as a stop, and the shift of the driving shift device reaches a high gear, the control unit automatically increase the electrically assisted power of the electric vehicle to improve the riding comfort of the rider at the start.

According to the aforementioned automatic and manual electrical gear shifting apparatus and method for electric vehicles, the driving shift device is coupled to a transmission, and the transmission is an internal transmission, and when the sensing unit senses the driving status as a stop, the control unit resets the driving shift device to a start shift to improve the riding comfort of the rider at the start.

According to the aforementioned automatic and manual electrical gear shifting apparatus and method for electric vehicles, the manual electrical gear shifting unit is an operating panel, and the manual electrical gear shifting unit includes an upshift button and a downshift button, and the upshift button increases a shift value in a gear shift command to increase the total shift value of the control unit indirectly, and the downshift button decreases a shift value of in a gear shift command to decrease the total shift value of the control unit indirectly.

According to the aforementioned automatic and manual electrical gear shifting apparatus and method for electric vehicles, the sensing unit is a slope sensor, a speed sensor, a torque sensor, a pressure sensor, or a current sensor, and the slope sensor is a G-sensor or a level meter.

According to the aforementioned automatic and manual electrical gear shifting apparatus and method for electric vehicles, the apparatus further comprises a shift display device coupled to the control unit, for displaying the corresponding total shift value.

According to the aforementioned automatic and manual electrical gear shifting apparatus and method for electric vehicles, the driving shift device further comprises a motor unit, a disc and a shift control element; the motor unit includes an extended motor transmission shaft mechanically coupled to the disc and the shift control element; the disc has a center fixed to the motor transmission shaft, and an external periphery coupled to a shift cable of a two-wheel electric vehicle, and the shift cable is coupled to a transmission of the two-wheel electric vehicle, and the transmission has a plurality of different shifts; the shift control element includes an inner ring portion and an outer ring portion corresponding to each other, and the outer ring portion is fixed to a frame of the two-wheel electric vehicle, and the inner ring portion is coupled to the motor transmission shaft, and the inner ring portion includes a plurality of different nodes corresponsive to the outer ring portion, and the nodes correspond to the different shifts of the transmission respectively; thereby, after the motor unit receives a gear shift command, the inner ring portion is rotated to change the node, and the disc is rotated to drive the shift cable to switch a shift of the transmission.

According to the aforementioned automatic and manual electrical gear shifting apparatus and method for electric vehicles, the inner ring portion includes at least one elastic element installed at an outer ring surface of the inner ring portion, and the elastic element has a latching portion; and the outer ring portion includes a plurality of grooves formed on an inner ring surface of the outer ring portion and having a quantity greater than the quantity of the elastic elements, and the grooves are corresponsive to the latching portions, and the latching portions abut the different grooves to define different nodes.

According to the aforementioned automatic and manual electrical gear shifting apparatus and method for electric vehicles, the outer ring portion includes at least one elastic element installed on an inner ring surface of the outer ring portion, and the elastic element has a latching portion; and the inner ring portion includes a plurality of grooves formed on an outer ring surface of the inner ring portion and having a quantity greater than the quantity of the elastic elements, and the grooves are corresponsive to the latching portions, and the latching portions abut the different grooves to define different nodes.

In summation of the aforementioned description and method, the present invention has the following advantages and effects:

1. The present invention can be applied to a forward transmission, a reverse transmission, an external transmission or an internal transmission of a two-wheel electric vehicle. For the forward transmission, reverse transmission or external transmission of an electric vehicle, if the driving shift device is situated at a high gear, then the torque of the mid-power motor will be increased to improve the electrically assisted power and reduce the user's force applied for a start of riding uphill. For the internal transmission, if the electric vehicle stops, the control unit resets the driving shift device to the start shift to prevent a shift deviation of the internal transmission.

2. The present invention can turn off the second switch unit and just uses the sensing unit to detect the driving status of the two-wheel electric vehicle to perform the shifting by an automatic electric shift, the invention can turn off the first switch unit and just use the manual electrical gear shifting unit to perform the shifting by an automatic electric shift, or the invention can turn on the first switch unit and the second switch unit simultaneously to perform a gear shifting by an automatic electric shift or a manual electric shift. The control unit analyzes and computes the shift command and the sensing signal to generate an electrical shift signal and a total shift value, not only performing the gear shifting by the driving shift device, but also changing the torque of the mid-power motor, so that the driving shift device and the mid-power motor can be operated together to achieve a smooth gear shifting.

3. The present invention allows a user to use the manual electrical gear shifting unit to shift the gear by an electric manual mode according to the actual using situation such as going uphill, so as to reduce the user's burden of pedaling the electric vehicle while riding the electric vehicle uphill, so as to achieve the effects of a convenient operation and a broad scope of applicability.

4. The present invention has the installation of the shift correction unit, such that after the driving shift device shifts to the setting, the control unit is notices, and the total shift value is corrected, and the shift display device is provided for displaying the total shift value to allow the user to know about the current driving shift device and the node and shift of the transmission, so that the users can change the shifting mode anytime according to their preference or requirement to prevent misjudgment or exceed the gear shifting range, so as to enhance the stability and safety of the gear shifting.

DESCRIPTION OF THE PREFERRED EMBODIMENTS

Figure 1:
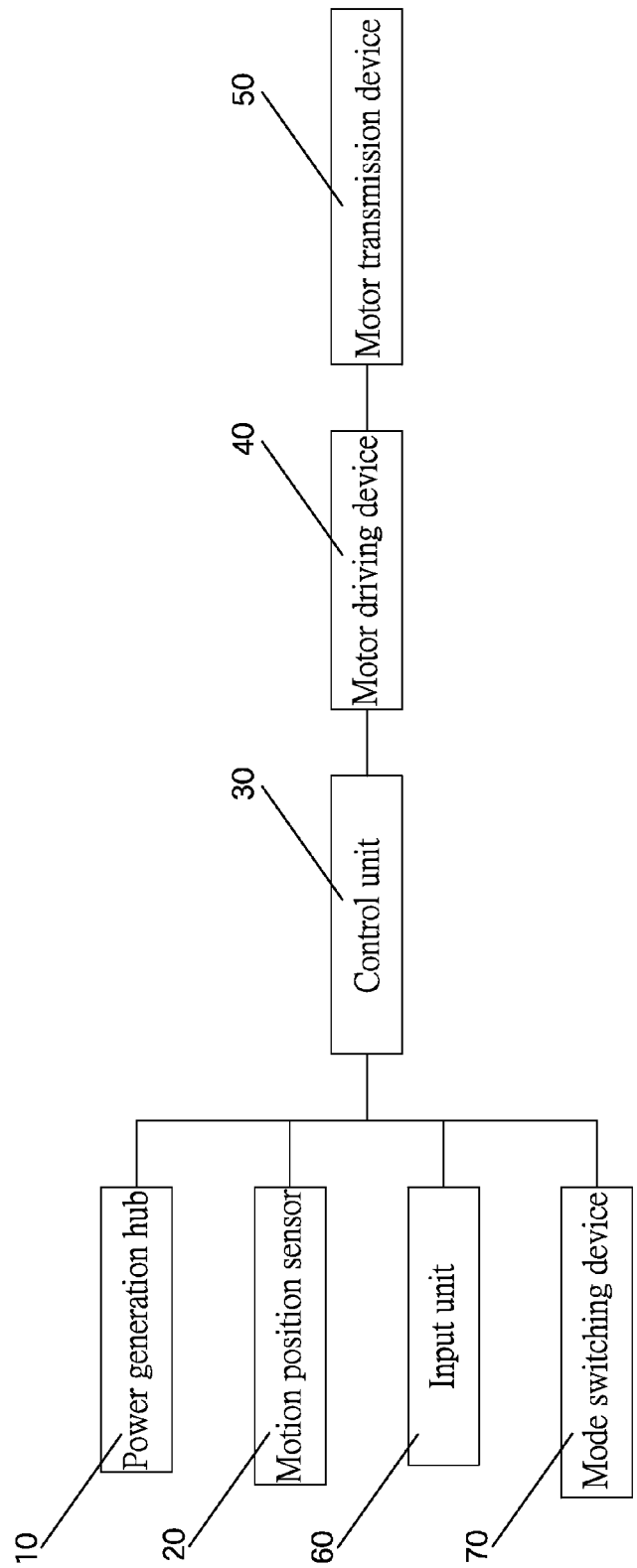
FIG. 1 is a schematic view of a conventional speed shifting structure of a bicycle.

The aforementioned and other objectives and advantages of the present invention will become clearer in light of the following detailed description of an illustrative embodiment of this invention described in connection with the drawings. It is intended that the embodiments and drawings disclosed herein are to be considered illustrative rather than restrictive.

With reference to FIGS. 2 to 8 for an automatic and manual electrical gear shifting apparatus and method for electric vehicles in accordance with a first preferred embodiment of the present invention, the automatic and manual electrical gear shifting apparatus and method for electric vehicles comprises:

a manual electrical gear shifting unit 1, operated manually, for transmitting a gear shift command, wherein the manual electrical gear shifting unit 1 is an operating panel, and the manual electrical gear shifting unit 1 includes an upshift button 11 and a downshift button 12;

a sensing unit 2, for detecting a driving status, and transmitting a sensing signal, wherein the sensing unit 2 is a slope sensor 21, a speed sensor 22, a torque sensor 23, a pressure sensor 24, or a current sensor 25, and the slope sensor 21 is a G-sensor or a level meter;

a control unit 3, coupled to the sensing unit 2 and the manual electrical gear shifting unit 1, and further coupled to a driving shift device 4 and a mid-power motor 5, wherein a shift correction unit 33 is coupled between the driving shift device 4 and the control unit 3, and the control unit 3 is provided for analyzing and computing the shift command and the sensing signal to generate an electrical shift signal and a total shift value, and a first switch unit 31 is installed between the sensing unit 2 and the control unit 3, and the first switch unit 31 is provided for controlling the control unit 3 to selectively receive the sensing signal; and a second switch unit 32 is coupled between the manual electrical gear shifting unit 1 and the control unit 3, and the second switch unit 32 is provided for controlling the control unit 3 to selectively stop receiving the gear shift command; and the driving shift device 4 is coupled to a transmission 61 of a two-wheel electric vehicle 6, and the transmission 61 is a forward transmission 61a, a reverse transmission 61b, an external transmission or an internal transmission 61c; the upshift button 11 increases a shift value in a gear shift command to drive the control unit 3 to increase the total shift value indirectly, and the downshift button 12 decreases a shift value in a gear shift command to drive the control unit 3 to decrease the total shift value indirectly; the control unit 3 has a high gear value; and the control unit 3 also has a control function of improving the riding comfort of a user at a start; and a shift display device 7, coupled to the control unit 3, for displaying the total shift value;

such that the driving shift device 4 can receive the electrical shift signal to perform a gear shift, and the mid-power motor 5 can perform a torque gear shift by the control unit 3, and the shift correction unit 33 has a setting and notices the control unit to correct the total shift value when the driving shift device 4 changes the shift to the setting; and the transmission 61 is a forward transmission 61a, a reverse transmission 61b or an external transmission. If the sensing unit 2 senses the driving status as a stop, and the shift of the driving shift device 4 reaches the high gear value, then the control unit 3 will increase the electrically assisted power of the electric vehicle automatically to improve the riding comfort of a rider at a start. The control unit 3 increases the torque of the mid-power motor 5 to increase the electrically assisted power, and decrease the user's force applied for riding uphill. If the transmission 61 is an internal transmission 61c, and the sensing unit 2 senses the driving status as a stop, the control unit 3 will reset the driving shift device 4 to a start shift to prevent a deviation of the shift of the internal transmission 61c, so as to improve the rider's riding comfort at a start.

Figure 4:
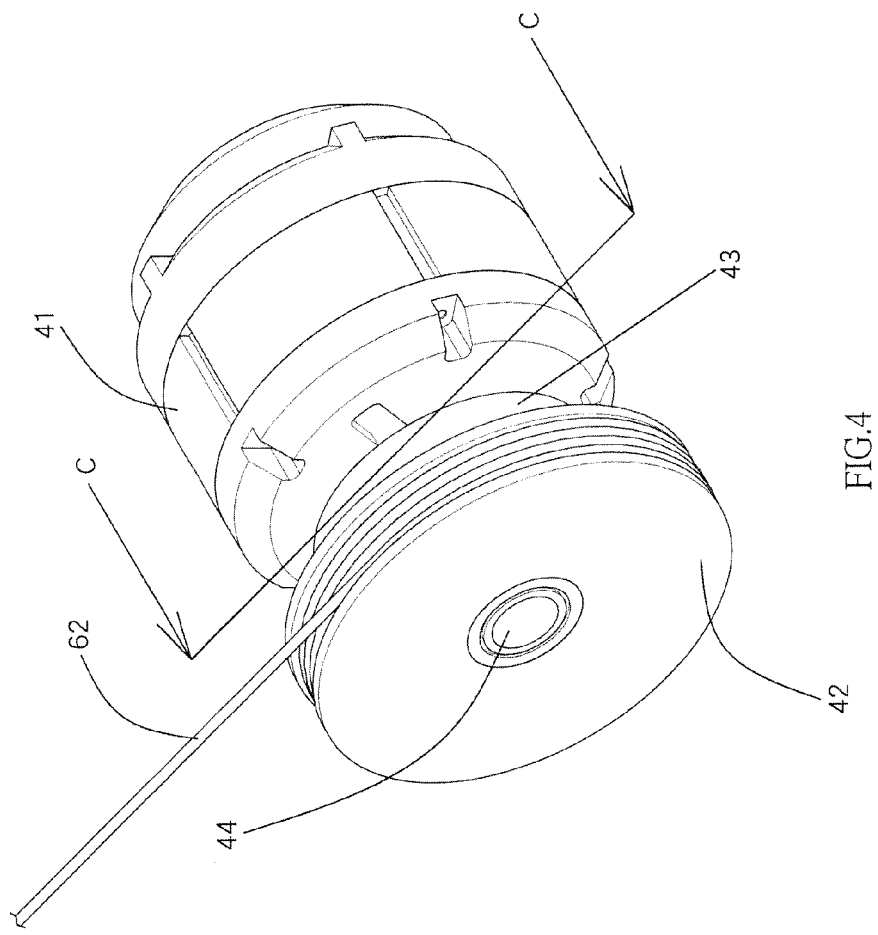
FIG. 4 is a perspective view of a driving shift device in accordance with a first preferred embodiment of the present invention.
Figure 5:
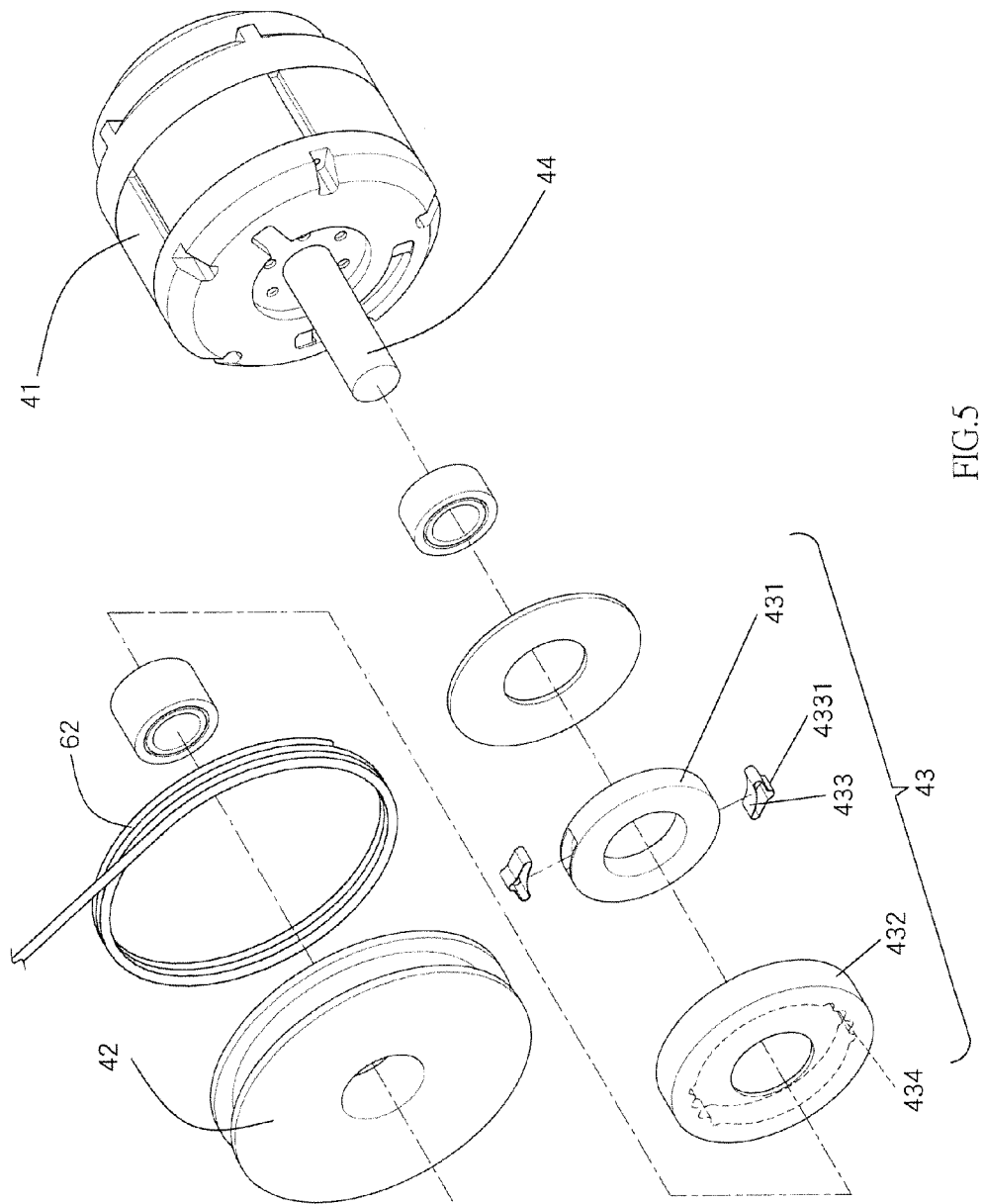
FIG. 5 is an exploded view of a driving shift device in accordance with the first preferred embodiment of the present invention.
Figure 6:
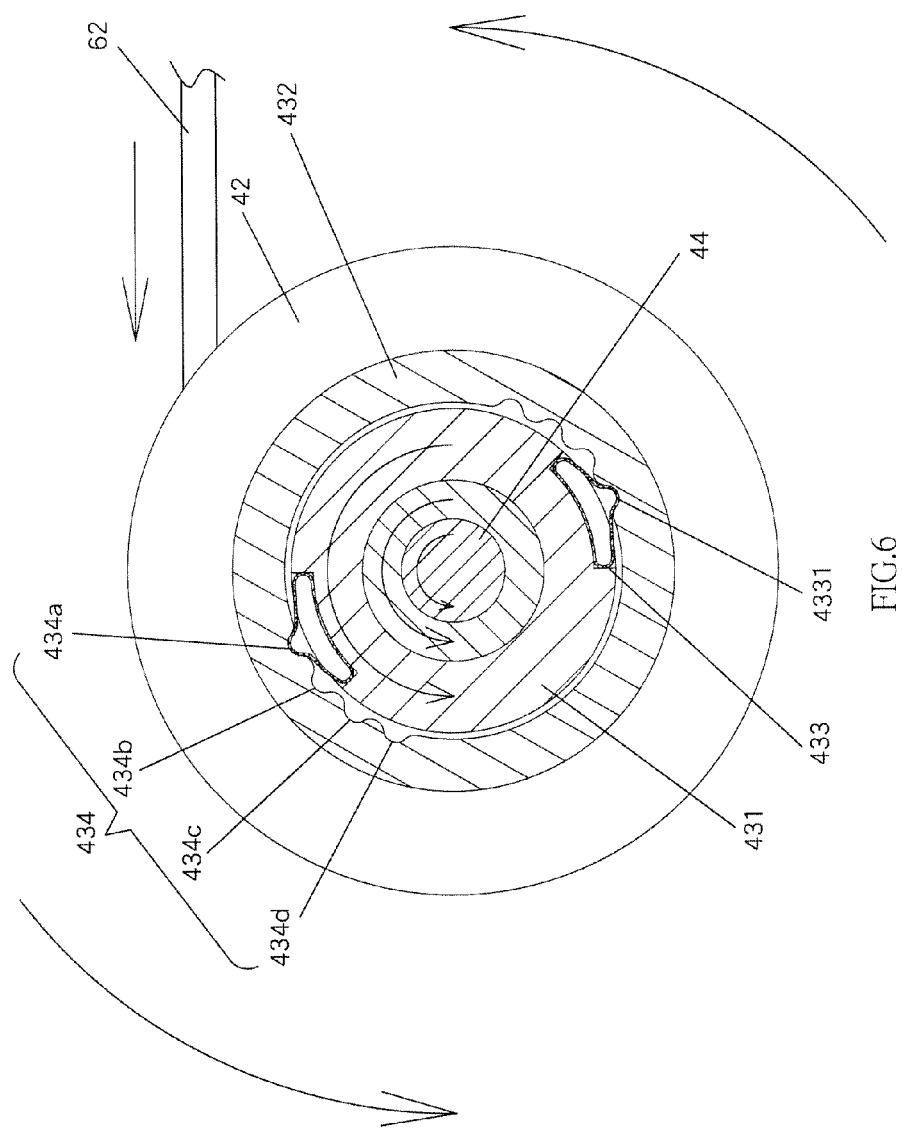
FIG. 6 is a sectional view of Section C-C of FIG. 8.

In FIGS. 4 to 6, the driving shift device 4 further comprises a motor unit 41, a disc 42 and a shift control element 43, wherein the motor unit 41 includes an extended motor transmission shaft 44 mechanically coupled to the disc 42 and the shift control element 43, and the center of the disc 42 is fixed to the motor transmission shaft 44, and the external periphery of the disc 42 is coupled to a shift cable 62 of a two-wheel electric vehicle 6, and the shift cable 62 is coupled to a transmission 61 of the two-wheel electric vehicle 6, and the transmission 61 has a plurality of different shift. The shift control element 43 includes an inner ring portion 431 and an outer ring portion 432 corresponding to each other, and the outer ring portion 432 is fixed to a frame of the two-wheel electric vehicle 6, and the inner ring portion 431 is coupled to the motor transmission shaft 44, and the inner ring portion 431 includes a plurality of different nodes corresponding to the outer ring portion 432, and the nodes are corresponsive to different shifts of the transmission 61 respectively, such that after the motor unit 41 receives a gear shift command, the inner ring portion 431 will be rotated to change the node, and the disc 42 is rotated to drive the shift cable 62 to switch a shift of the transmission 61. The outer ring surface of the inner ring portion 431 has at least one elastic element 433, and the elastic element 433 has a latching portion 4331. The inner ring surface of the outer ring portion 432 has a plurality of grooves 434 formed thereon and having a quantity greater than the quantity of elastic elements 433, and the grooves 434 are corresponsive to the latching portion 4331, such that the latching portion 4331 can abut against the different grooves 434 to define different nodes.

Figure 2:
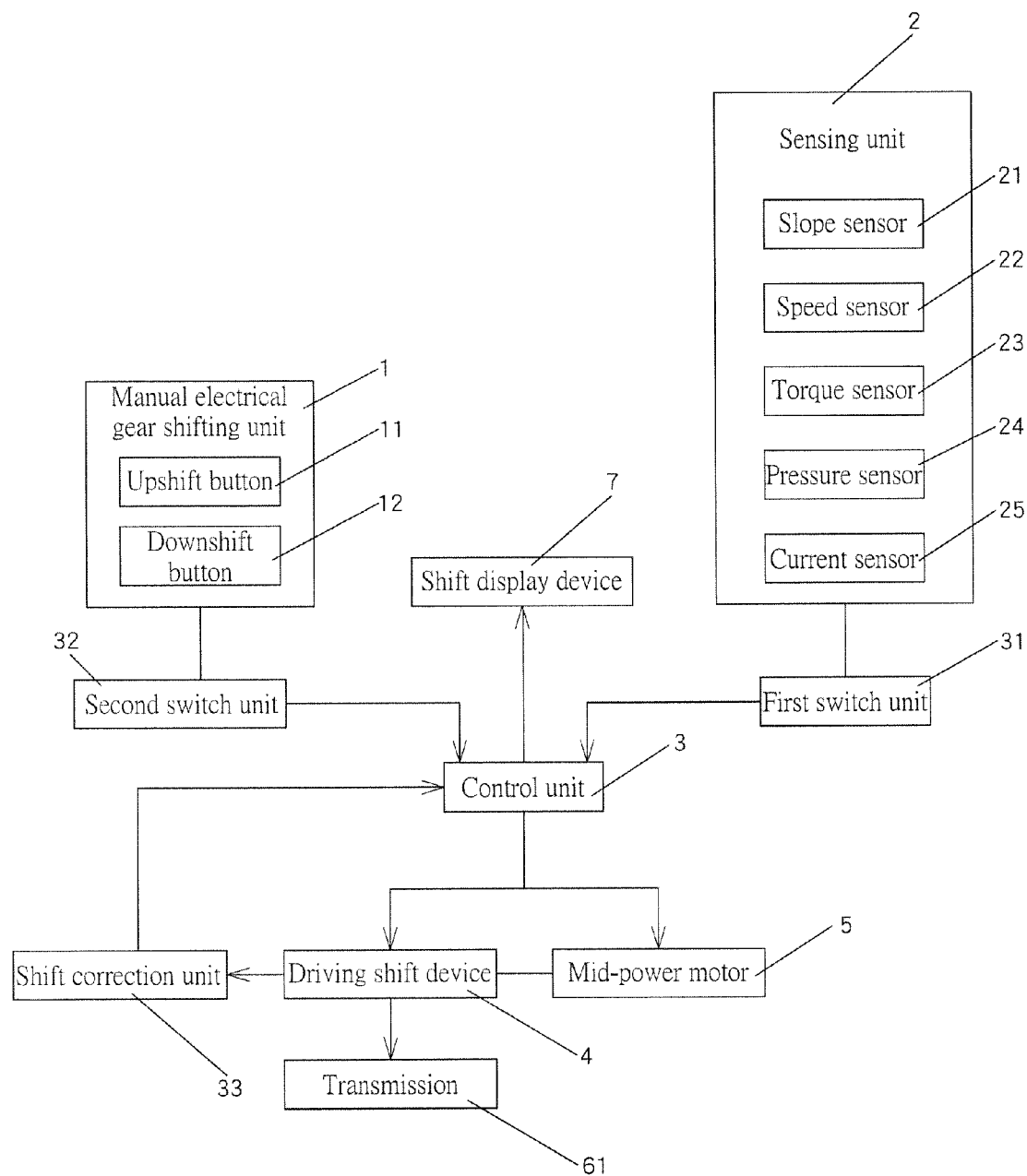
FIG. 2 is a schematic structural view of a preferred embodiment of the present invention.
Figure 3:
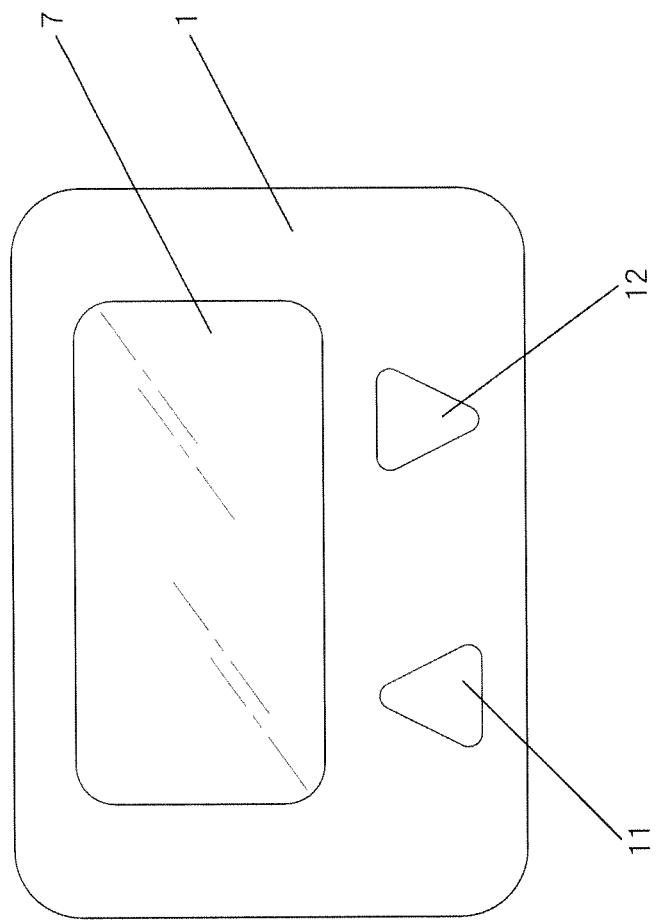
FIG. 3 is a front view of a manual electrical gear shifting unit of the present invention.

With reference to FIGS. 2 and 3 for the operation status of the present invention, if only the electric manual mode is used for shifting the gear, the first switch unit 31 can be turned off to stop the first switch unit 31 from receiving the sensing signal. Since the sensing signal is interrupted, therefore the control unit 3 can receive a shift command to perform analyses and computations. Assumed that the node and the total shift value of the driving shift device 4 are set to initial values, the control unit 3 can receive the signal of the upshift button 11 or downshift button 12 controlled by the user, so that the gear shift command can increase or decrease a shift value to increase or decrease the total shift value of the control unit 3 indirectly, and the control unit 3 is provided for transmitting an electrical shift signal to the driving shift device 4 to conduct a gear shifting. In the meantime, the mid-power motor 5 changes the torque, so that the driving shift device 4 and the mid-power motor 5 are corresponsive to each other to achieve a smooth gear shifting. For instance, when the user rides the electric vehicle uphill, the user can shift the gear by the electric manual mode to reduce the user's burden of pedaling the electric vehicle while riding uphill, so as to achieve the effects of a convenient operation and a broad scope of applicability.

If only the sensing unit 2 is used for sensing the driving status, then the first switch unit 31 can be turned on to drive the first switch unit 31 to receive a sensing signal, and the second switch unit 32 can be turned off to drive the control unit 3 to stop receiving the gear shift command, wherein the driving status includes a driving force for a user to ride a two-wheel electric vehicle 6, a traveling speed, a power consumption, an electrically assisted power level, a current shift and an inclination of a slope, and the driving status is analyzed and computed to generate and transmit a sensing signal to the control unit 3. If the sensing unit 2 is a slope sensor 21, the sensing signal is the inclination of the slope measured by the sensing unit 2. If the sensing unit 2 is a speed sensor 22, the sensing signal is the speed of the two-wheel electric vehicle 6. If the sensing unit 2 is a torque sensor 23, a pressure sensor 24 or a current sensor 25, the sensing signal is a driving force applied by a user to ride the two-wheel electric vehicle 6. If there is a plurality of different sensing units 2, they can be slope sensors 21, speed sensors 22, torque sensors 23, pressure sensors 24 and/or current sensors 25. The slope sensor 21 is a G-sensor or a level meter. Now, the control unit 3 receives the sensing signals transmitted from the sensing units 2 and analyzes and computes a gear shift better for the status of the two-wheel electric vehicle 6. For instance, the sensing unit 2 is a slope sensor 21, and the control unit 3 can further filter the noise of a slope produced by the sensing unit 2 due to a rough road surface. Assumed that the node and the total shift value of the driving shift device 4 are situated at the initial values, the control unit 3 analyzes the sensing signal of the sensing unit 2 and determines a better gear shift for the driving status of a the two-wheel electric vehicle 6, so that the total shift value is incremented or decremented, and the control unit 3 drives the driving shift device 4 to change gears, while the control unit 3 is changing the torque of the mid-power motor 5. Therefore, the driving shift device 4 and the mid-power motor 5 of the present invention can be operated together to achieve a stable gear shifting operation.

If a user wants to adjust the gear shift of the two-wheel electric vehicle by the sensing unit 2 to a more appropriate gear shift according to the using status, the user can turn on both of the first switch unit 31 and the second switch unit 32 to allow the first switch unit 31 to receive the sensing signal, while the user can operate the manual electrical gear shifting unit 1. Assumed that both node and total shift value of the driving shift device 4 are set to the initial values, the control unit 3 receives a shift command and a sensing signal for analysis and computation, so as to determine a better shift for the driving status of the two-wheel electric vehicle 6 and suitable for the electric manual adjustment, so that the total shift value is incremented or decremented from the initial value, and the driving shift device 4 performs a gear shift, while the control unit 3 changes the torque of the mid-power motor 5. Therefore, the manual electrical gear shifting unit 1 and the sensing unit 2 perform a gear shift of the driving shift device 4 synchronously.

The present invention further comprises a shift correction unit 33 for shifting the driving shift device 4 to the setting to notice the control unit 3 to correct the total shift value, prevent misjudgment, or exceed the gear shifting range, so as to improve the stability and safety of the gear shifting. In addition, the present invention displays the total shift value on the shift display device 7 to remind the user about the changed shift, and facilitate the user to make another gear shifting accordingly.

With reference to FIGS. 4 to 6, the driving shift device 4 is situated at the first node; and now, the elastic element 433 abuts at the groove 434a. If the driving shift device 4 needs to shift to a high gear, the motor unit 41 will turn the motor transmission shaft 44, the bearing and the inner ring portion 431 counterclockwise, and the elastic element 433 of the inner ring portion 431 is compressed to rotate towards the groove 434b, so that the elastic element 433 abuts at the groove 434b. Now, the disc 42 is turned counterclockwise to rewind the shift cable 62 of the two-wheel electric vehicle 6, so as to change the speed of the transmission 61 of the two-wheel electric vehicle 6. On the other hand, if the driving shift device 4 is situated at the last node, the elastic element 433 abuts at the groove 434d. If the driving shift device 4 needs to reduce to a lower shift, the motor unit 41 will be turned clockwise, so that the elastic element 433 is turned towards the groove 434c, so as to release the shift cable 62 from the disc 42 and change the speed of the transmission 61 of the two-wheel electric vehicle 6.

Figure 7:
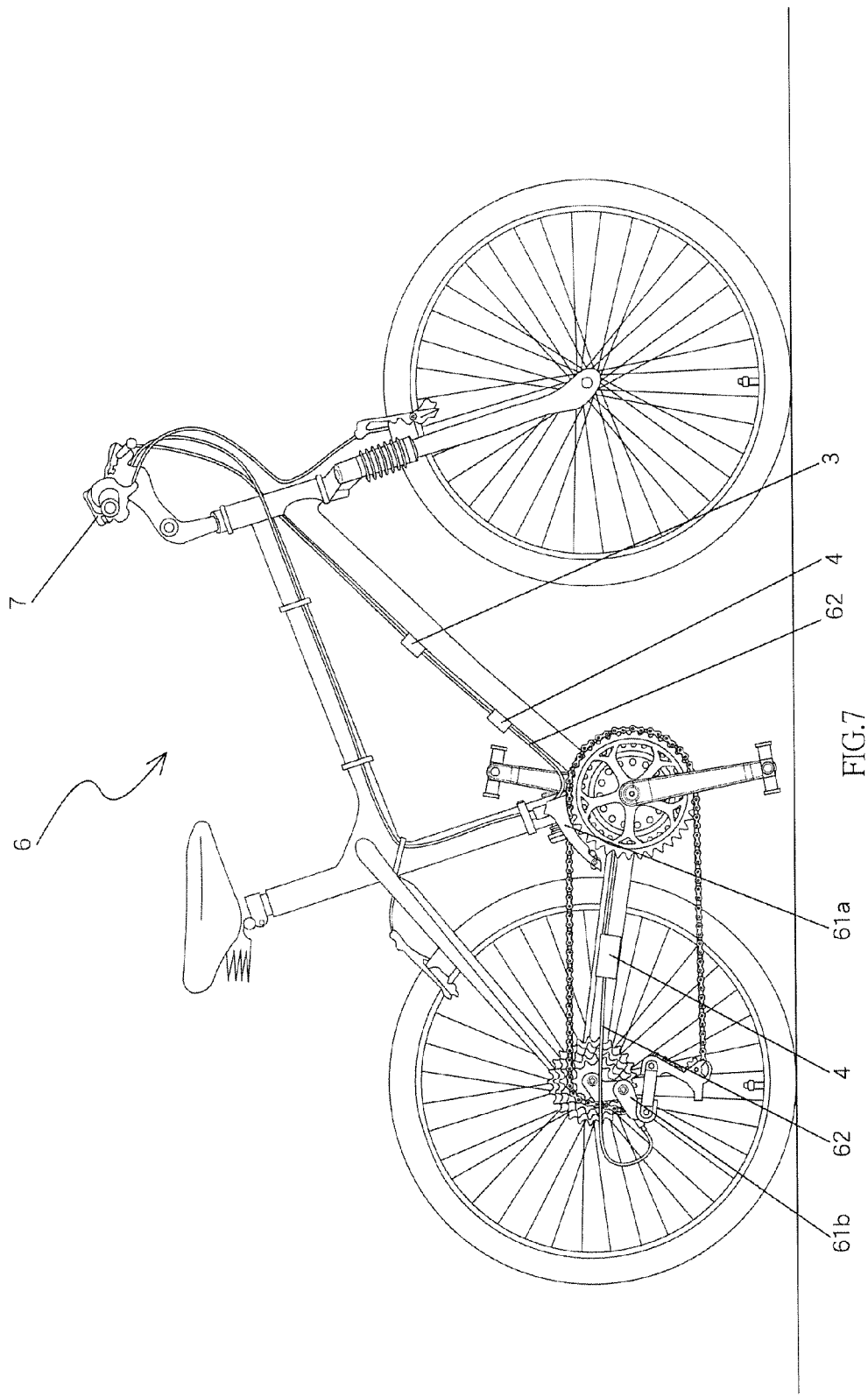
FIG. 7 is a schematic view of a using status of the present invention installed to a two-wheel electric vehicle having forward and reverse transmissions.
Figure 8:
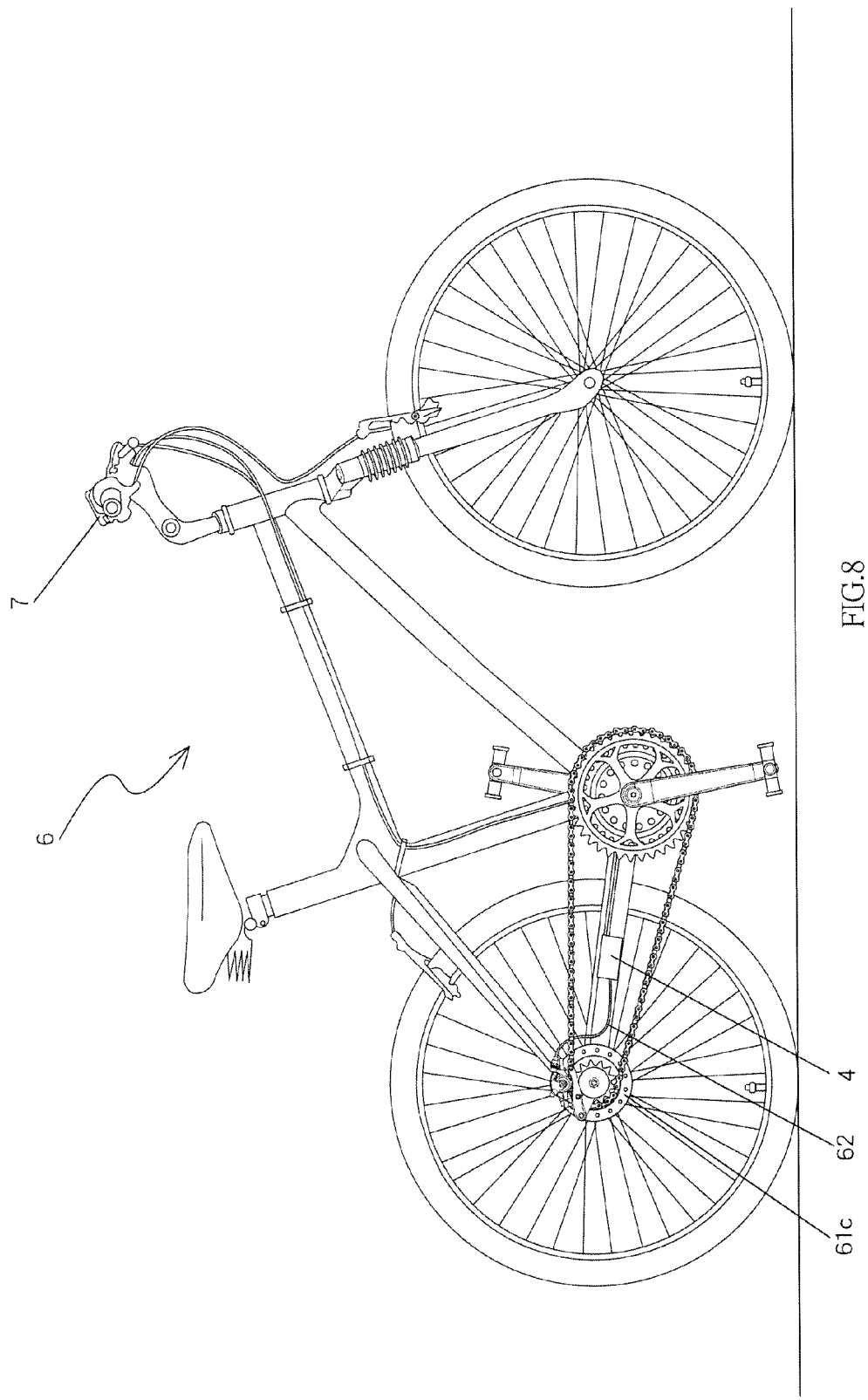
FIG. 8 is a schematic view of a using status of the present invention installed to a two-wheel electric vehicle having an internal transmission.

In FIG. 7, the present invention can be installed at the frame of the two-wheel electric vehicle 6 and coupled to the transmission 61 of the two-wheel electric vehicle 6, wherein the transmission 61 is a forward transmission 61a or a reverse transmission 61b as shown in FIG. 8 or the transmission 61 is an internal transmission 61c. Obviously, the present invention can be used extensively in two-wheel electric vehicles 6 with various different transmissions 61, and the installation position is not limited. The present invention has the features of simplified components, low cost, and convenient installation. The invention can be installed freely to the two-wheel electric vehicle 6, and the gear shift of the two-wheel electric vehicle 6 can be set by manually and/or automatic electric modes according to the user's preference or requirement.

Figure 9:
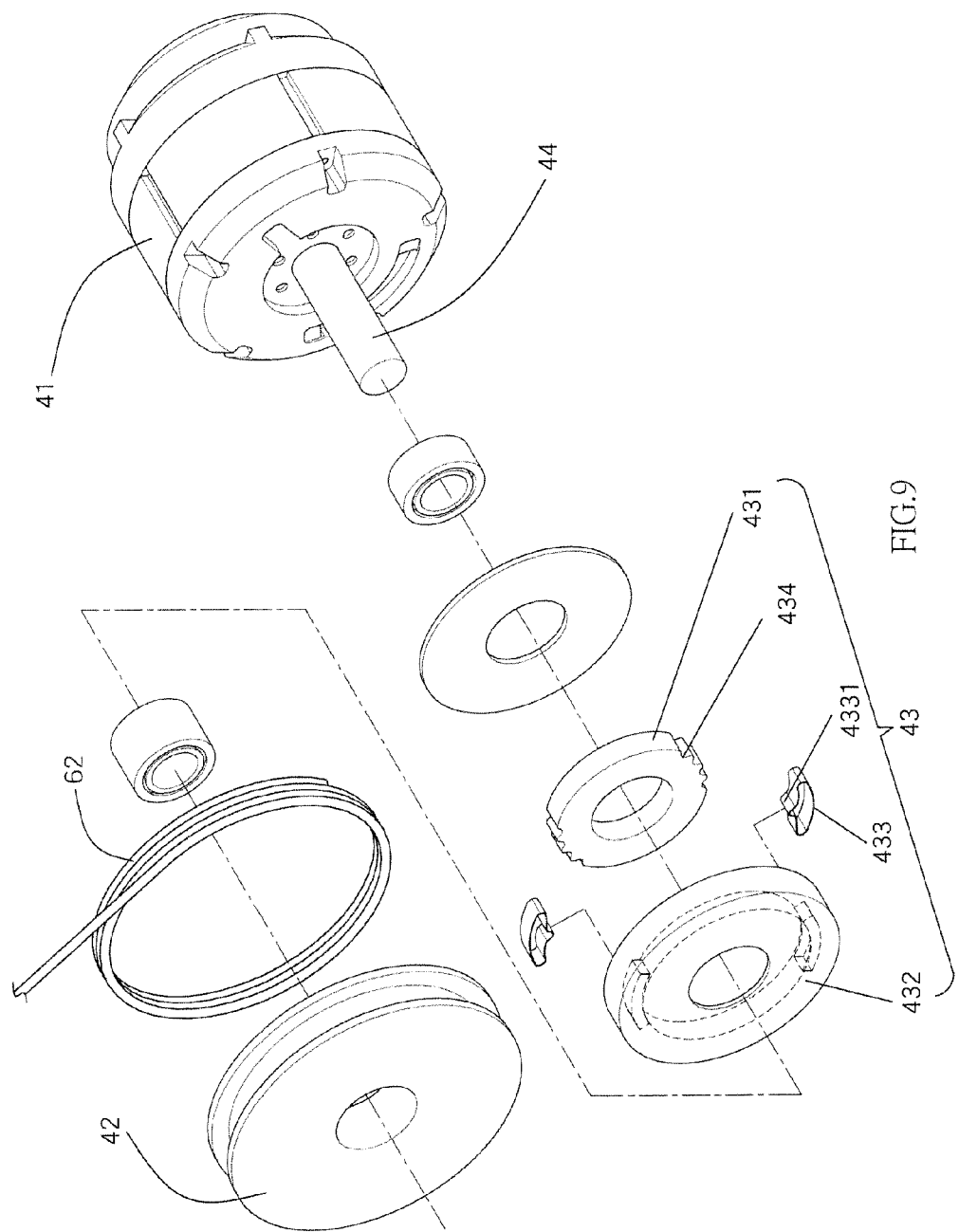
FIG. 9 is an exploded view of a driving shift device in accordance with a second preferred embodiment of the present invention.
Figure 10:
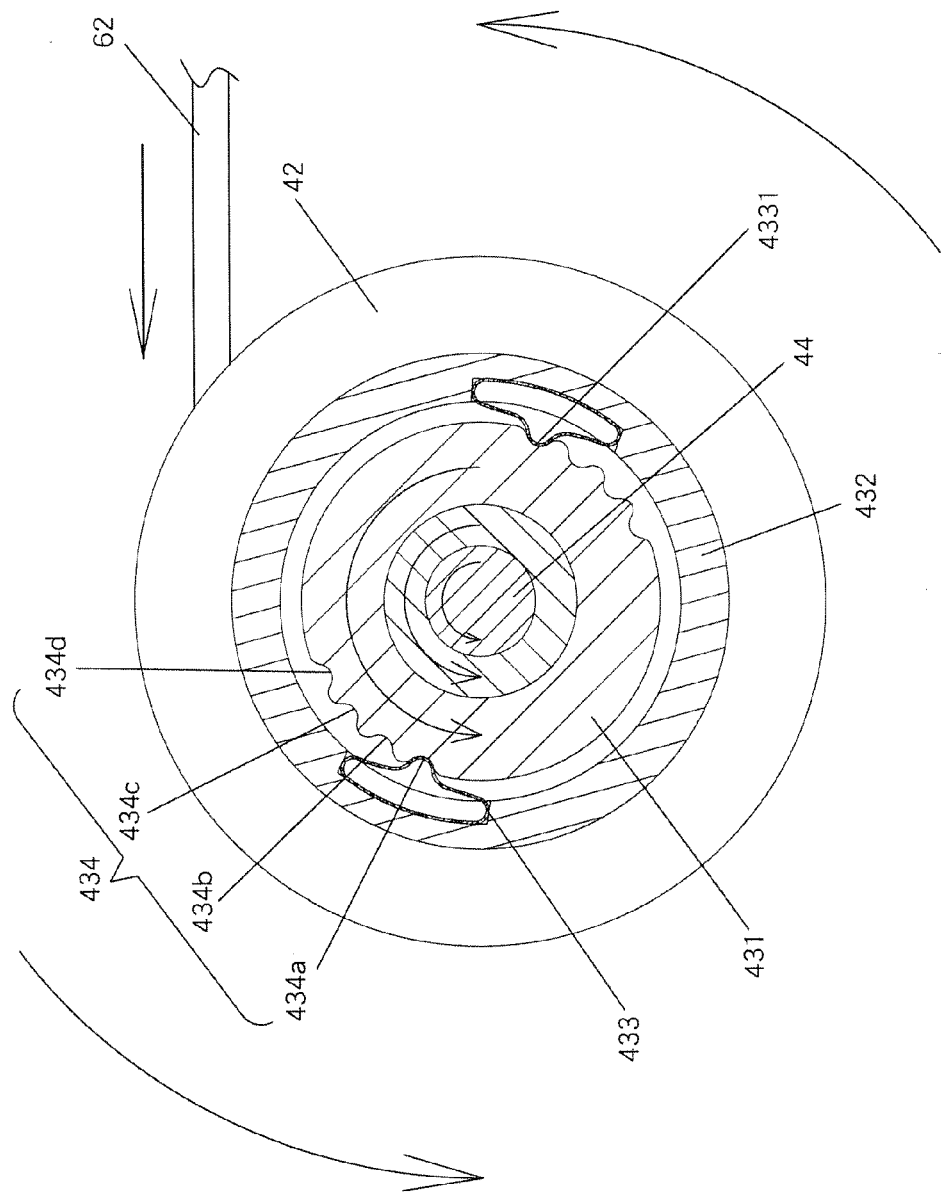
FIG. 10 is a sectional view of a driving shift device in accordance with the second preferred embodiment of the present invention.

With reference to FIGS. 9 and 10 for the second preferred embodiment of the present invention, the difference between this preferred embodiment and the first preferred embodiment resides on that the inner ring surface of the outer ring portion 432 has at least one elastic element 433, and the elastic element 433 has a latching portion 4331. The outer ring surface of the inner ring portion 431 has a plurality of grooves 434 formed thereon and having a quantity greater than the quantity of elastic elements 433, and the grooves 434 are corresponsive to the latching portion 4331. The latching portion 4331 abuts at the different grooves 434 to define different nodes. The operating method is the same as that of the previous preferred embodiment, and thus will not be repeated.

In summation of the above description, the present invention herein enhances the performance than the conventional structure and further complies with the patent application requirements and is duly submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An automatic and manual electrical gear shifting apparatus for electric vehicles, comprising:
   a manual electrical gear shifting unit, operated manually, for transmitting a gear shift command;
   a sensing unit, for detecting a driving status, and transmitting a sensing signal;
   a control unit, coupled to the sensing unit and the manual electrical gear shifting unit, and further coupled to a driving shift device and a mid-power motor; and
   a first switch unit installed between the sensing unit and the control unit, and a second switch unit installed between the manual electrical gear shifting unit and the control unit, and the first switch unit being controlled to selectively stop the control unit from receiving the sensing signal, and the second switch unit being controlled to selectively stop the control unit from receiving the gear shift command;
   wherein the control unit is provided for analyzing and computing the shift command and the sensing signal to generate an electrical shift signal and a total shift value, and the control unit further including a control function for improving the riding comfort of a rider at a start; such that the driving shift device can receive the electrical shift signal to perform a gear shift, and the mid-power motor can perform a torque gear shift by the control unit.

2. An automatic and manual electrical gear shifting apparatus for electric vehicles comprising:
   a manual electrical gear shifting unit, operated manually, for transmitting a gear shift command;
   a sensing unit, for detecting a driving status, and transmitting a sensing signal; and
   a control unit, coupled to the sensing unit and the manual electrical gear shifting unit, and further coupled to a driving shift device and a mid-power motor, the control unit being provided for analyzing and computing the shift command and the sensing signal to generate an electrical shift signal and a total shift value, and the control unit further including a control function for improving the riding comfort of a rider at a start; such that the driving shift device can receive the electrical shift signal to perform a gear shift, and the mid-power motor can perform a torque gear shift by the control unit;
   wherein the driving shift device is coupled to a transmission, and when the sensing unit senses the driving status as a stop, and the shift of the driving shift device reaches a high gear, the control unit automatically increase the electrically assisted power of the electric vehicle to improve the riding comfort of the rider at the start.

3. The automatic and manual electrical gear shifting apparatus for electric vehicles according to claim 1, wherein the driving shift device is coupled to a transmission, and the transmission is an internal transmission, and when the sensing unit senses the driving status as a stop, the control unit resets the driving shift device to a start shift to improve the riding comfort of the rider at the start.

4. The automatic and manual electrical gear shifting apparatus for electric vehicles according to claim 1, wherein the manual electrical gear shifting unit is an operating panel, and the manual electrical gear shifting unit includes an upshift button and a downshift button, and the upshift button increases a shift value in a gear shift command to increase the total shift value of the control unit indirectly, and the downshift button decreases a shift value of in a gear shift command to decrease the total shift value of the control unit indirectly.

5. The automatic and manual electrical gear shifting apparatus for electric vehicles according to claim 1, wherein the sensing unit is a slope sensor, a speed sensor, a torque sensor, a pressure sensor, or a current sensor, and the slope sensor is a G-sensor or a level meter.

6. The automatic and manual electrical gear shifting apparatus for electric vehicles according to claim 1, further comprising a shift display device coupled to the control unit, for displaying the corresponding total shift value.

7. An automatic and manual electrical gear shifting apparatus for electric vehicles comprising;
   a manual electrical gear shifting unit, operated manually, for transmitting a gear shift command;
   a sensing unit, for detecting a driving status, and transmitting a sensing signal; and
   a control unit, coupled to the sensing unit and the manual electrical gear shifting unit, and further coupled to a driving shift device and a mid-power motor, the control unit being provided for analyzing and computing the shift command and the sensing signal to generate an electrical shift signal and a total shift value, and the control unit further including a control function for improving the riding comfort of a rider at a start; such that the driving shift device can receive the electrical shift signal to perform a gear shift, and the mid-power motor can perform a torque gear shift by the control unit;
   wherein the driving shift device further comprises a motor unit, a disc and a shift control element; the motor unit includes an extended motor transmission shaft mechanically coupled to the disc and the shift control element; the disc has a center fixed to the motor transmission shaft, and an external periphery coupled to a shift cable of a two-wheel electric vehicle, and the shift cable is coupled to a transmission of the two-wheel electric vehicle, and the transmission has a plurality of different shifts; the shift control element includes an inner ring portion and an outer ring portion corresponding to each other, and the outer ring portion is fixed to a frame of the two-wheel electric vehicle, and the inner ring portion is coupled to the motor transmission shaft, and the inner ring portion includes a plurality of different nodes corresponsive to the outer ring portion, and the nodes correspond to the different shifts of the transmission respectively; thereby, after the motor unit receives a gear shift command, the inner ring portion is rotated to change the node, and the disc is rotated to drive the shift cable to switch a shift of the transmission.

8. The automatic and manual electrical gear shifting apparatus for electric vehicles according to claim 7, wherein the inner ring portion includes at least one elastic element installed at an outer ring surface of the inner ring portion, and the elastic element has a latching portion; and the outer ring portion includes a plurality of grooves formed on an inner ring surface of the outer ring portion and having a quantity greater than the quantity of the elastic elements, and the grooves correspond to the latching portions, and the latching portions abut the different grooves to define different nodes.

9. The automatic and manual electrical gear shifting apparatus and method for electric vehicles according to claim 7, wherein, the outer ring portion includes at least one elastic element installed on an inner ring surface of the outer ring portion, and the elastic element has a latching portion; and the inner ring portion includes a plurality of grooves formed on an outer ring surface of the inner ring portion and having a quantity greater than the quantity of the elastic elements, and the grooves correspond to the latching portions, and the latching portions abut the different grooves to define different nodes.

10. The automatic and manual electrical gear shifting apparatus for electric vehicles according to claim 2, wherein the manual electrical gear shifting unit is an operating panel, and the manual electrical gear shifting unit includes an upshift button and a downshift button, and the upshift button increases a shift value in a gear shift command to increase the total shift value of the control unit indirectly, and the downshift button decreases a shift value of in a gear shift command to decrease the total shift value of the control unit indirectly.

11. The automatic and manual electrical gear shifting apparatus for electric vehicles according to claim 2, wherein the sensing unit is a slope sensor, a speed sensor, a torque sensor, a pressure sensor, or a current sensor, and the slope sensor is a G-sensor or a level meter.

12. The automatic and manual electrical gear shifting apparatus for electric vehicles according to claim 2, further comprising a shift display device coupled to the control unit, for displaying the corresponding total shift value.

13. The automatic and manual electrical gear shifting apparatus for electric vehicles according to claim 7, wherein the manual electrical gear shifting unit is an operating panel, and the manual electrical gear shifting unit includes an upshift button and a downshift button, and the upshift button increases a shift value in a gear shift command to increase the total shift value of the control unit indirectly, and the downshift button decreases a shift value of in a gear shift command to decrease the total shift value of the control unit indirectly.

14. The automatic and manual electrical gear shifting apparatus for electric vehicles according to claim 7, wherein the sensing unit is a slope sensor, a speed sensor, a torque sensor, a pressure sensor, or a current sensor, and the slope sensor is a G-sensor or a level meter.

15. The automatic and manual electrical gear shifting apparatus for electric vehicles according to claim 7, further comprising a shift display device coupled to the control unit, for displaying the corresponding total shift value.

* * * * *